US008626621B2

(12) United States Patent
Cooper et al.

(10) Patent No.: US 8,626,621 B2
(45) Date of Patent: Jan. 7, 2014

(54) CONTENT STREAM MANAGEMENT

(75) Inventors: Paul R. Cooper, San Jose, CA (US); Matt Henry Van der Staay, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 240 days.

(21) Appl. No.: 12/715,779

(22) Filed: Mar. 2, 2010

(65) Prior Publication Data

US 2011/0218897 A1 Sep. 8, 2011

(51) Int. Cl.
*G07F 19/00* (2006.01)
*H04M 15/00* (2006.01)
*G06F 15/16* (2006.01)

(52) U.S. Cl.
USPC .......... 705/34; 709/231

(58) Field of Classification Search
USPC .......... 705/34; 709/231
See application file for complete search history.

(56) References Cited

U.S. PATENT DOCUMENTS 6,553,568 B1 * 4/2003 Fijolek et al. .......... 725/111
7,127,737 B1 * 10/2006 Bayrakeri et al. .......... 725/95
7,685,306 B2 * 3/2010 McEnroe et al. .......... 709/231
7,746,899 B2 * 6/2010 Kim .......... 370/468
2002/0026501 A1 * 2/2002 Hoang .......... 709/219
2002/0140851 A1 * 10/2002 Laksono .......... 348/388.1
2002/0154125 A1 * 10/2002 Coleman et al. .......... 345/473
2003/0031178 A1 * 2/2003 Haeri et al. .......... 370/392
2003/0055971 A1 3/2003 Menon
2003/0105834 A1 * 6/2003 Hoang .......... 709/219
2004/0240390 A1 * 12/2004 Seckin .......... 370/252
2005/0002401 A1 * 1/2005 Coleman et al. .......... 370/395.4
2005/0080904 A1 * 4/2005 Green .......... 709/227
2005/0120128 A1 6/2005 Willes et al.
2005/0152382 A1 * 7/2005 Stirling et al. .......... 370/403
2005/0235047 A1 * 10/2005 Li et al. .......... 709/219
2006/0114990 A1 * 6/2006 Pak .......... 375/240.03
2006/0190615 A1 * 8/2006 Panwar et al. .......... 709/231
2006/0193380 A1 * 8/2006 Laksono .......... 375/240.01
2006/0245355 A1 * 11/2006 Iwamura .......... 370/232
2007/0011346 A1 * 1/2007 Kim .......... 709/231
2007/0053428 A1 * 3/2007 Saleem et al. .......... 375/240
2007/0067508 A1 * 3/2007 Chai et al. .......... 710/33
2007/0076606 A1 * 4/2007 Olesinski et al. .......... 370/230
2007/0076728 A1 * 4/2007 Rieger et al. .......... 370/401
2007/0083666 A1 4/2007 Apelbaum
2007/0086366 A1 * 4/2007 Luo et al. .......... 370/260
2007/0147243 A1 * 6/2007 He et al. .......... 370/230
2007/0174476 A1 * 7/2007 McEnroe et al. .......... 709/231
(Continued)

OTHER PUBLICATIONS

Birney, Bill, "Streaming from a Web Server ", Retrieved at <<http://www.microsoft.com/windows/windowsmedia/howto/articles/webserver.aspx>>, Jun. 2003, pp. 4.

(Continued)

*Primary Examiner* — Seye Iwarere
(74) *Attorney, Agent, or Firm* — Wolfe-SBMC

(57) ABSTRACT

Content stream management techniques are described. In an implementation, a communication is examined at a client device from at least one other client device that describes per stream usage of network bandwidth by the at least one other client device to receive content. Usage of the network bandwidth at the client device is managed based on the communication and a determination of per stream usage of the network bandwidth to receive content by the client device that also consumes at least a portion of the network bandwidth.

20 Claims, 4 Drawing Sheets

(56) References Cited

U.S. PATENT DOCUMENTS

| | | | | |
|---|---|---|---|---|
| 2008/0062934 | A1 * | 3/2008 | Zhao | 370/332 |
| 2008/0144660 | A1 * | 6/2008 | Godlewski | 370/468 |
| 2008/0192820 | A1 * | 8/2008 | Brooks et al. | 375/240.02 |
| 2009/0028186 | A1 * | 1/2009 | Schmidt et al. | 370/468 |
| 2009/0080328 | A1 * | 3/2009 | Hu et al. | 370/230 |
| 2010/0257572 | A1 * | 10/2010 | Sridhar et al. | 725/116 |

OTHER PUBLICATIONS

Yu, et al. , “Understanding User Behavior in Large-Scale Video-On-Demand Systems”, Retrieved at <<http://ftp.cs.kuleuven.be/conference/EuroSys2006/papers/p333-yu.pdf>>, EuroSys’06, Apr. 18-21, 2006, pp. 333-344.

Krunz, Marwan, “Bandwidth Allocation Strategies for Transporting Variable Bit Ratevideo Traffic”, Retrieved at <<http://ieeexplore.ieee.org/stamp/stamp.jsp?arnumber=739277&isnumber=15968>>, IEEE Communications Magazine, Jan. 1999, pp. 40-46.

“The Future of IPTV Right Here, Right Now ”, Retrieved at http://www.sun.com/solutions/documents/pdf/me_iptv_brochure.pdf, Jan. 7, 2010, pp. 4.

* cited by examiner

CONTENT STREAM MANAGEMENT

BACKGROUND

Users have access to a wide variety of content from a wide variety of sources. Network access, for instance, may be used to provide a variety of content to a user, such as streaming movies, video-on-demand, music, downloadable content for local storage, and so on. However, the user may interact with a device at a location that shares bandwidth of the network with other devices, such as at a residence (e.g., the user's home), a business, and so on. Therefore, consumption of content by the other devices at the location may affect the ability of the user's device to consume content.

SUMMARY

Content stream management techniques are described. In an implementation, a communication is examined at a client device from at least one other client device that describes per stream usage of network bandwidth by the at least one other client device to receive content. Usage of the network bandwidth at the client device is managed based on the communication and a determination of per stream usage of the network bandwidth to receive content by the client device that also consumes at least a portion of the network bandwidth.

In an implementation, a client device includes one or more modules configured to determine per stream usage of content at the client device that consumes at least a portion of network bandwidth that is available at a location and form a communication to be communicated to at least one other client device that shares the network bandwidth that is available at the location with the client device. The communication describes per stream usage by the client device. Another communication is examined, from the at least one other client device, that describes per stream usage of the other client device that consumes at least a portion of the network bandwidth. Per stream usage by the client device is managed based at least in part on the determination of the per stream usage of content at the client device and the described per stream usage of the other client device described by the other communication.

In an implementation, one or more computer-readable media comprise instructions that are stored thereon that, responsive to execution by a client device, cause the client device to perform operations comprising comparing per stream usage of content that consumes network bandwidth with per stream usage of a plurality of streams of content usage by another client device that shares bandwidth that is assigned to a location that includes the client device and the other client device, prioritizing the per stream usage of the client device and the other client device; and implementing the prioritized per stream usage at the client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Users may have access to a wide variety of content via a network connection. However, in some instances a client device that is used by the user to access the content may share network bandwidth with other client devices. For example, the client device may be located in a home of the user that includes a variety of other client devices that are configured to access content via a network connection. However, the amount of bandwidth that is made available to the location may be limited, such that the client devices share the network bandwidth.

Although traditional techniques were developed to manage usage of the bandwidth, these techniques made a fundamental assumption that each device is configured to consume a single stream of content. Therefore, these traditional techniques failed when confronted with client devices that could consume multiple streams, such as digital video recorders having multiple tuners, client devices having multiple display devices, and so on.

Content stream management techniques are described. In an implementation, user activity is specified "per stream" of content to accurately reflect usage of network bandwidth. Further, communications that describe this usage are shared between devices that share the network bandwidth. Therefore, each of the client devices may make determinations on how to manage the network bandwidth through stream usage. For example, each of the client devices may employ techniques (e.g., algorithms) that assign priorities to the stream usage. Further, these algorithms may be configured to provide similar results such that each of the client devices makes a similar determination regarding how to manage the network bandwidth, which accordingly provides for decentralized management. Further discussion of the management techniques may be found in relation to the following sections.

In the following discussion, an example environment is first described that is operable to perform techniques to manage streams of content. Example procedures are then described that may be employed in the example environment, as well as in other environments. Although these techniques are described as employed within a television environment in the following discussion, it should be readily apparent that these techniques may be incorporated within a variety of environments without departing from the spirit and scope thereof For example, these techniques may be employed to manage provision of a variety of resources, such as a number of tuners, frequencies (e.g., satellite frequencies), CPU cycles, and so on.

Example Environment

Figure 1:
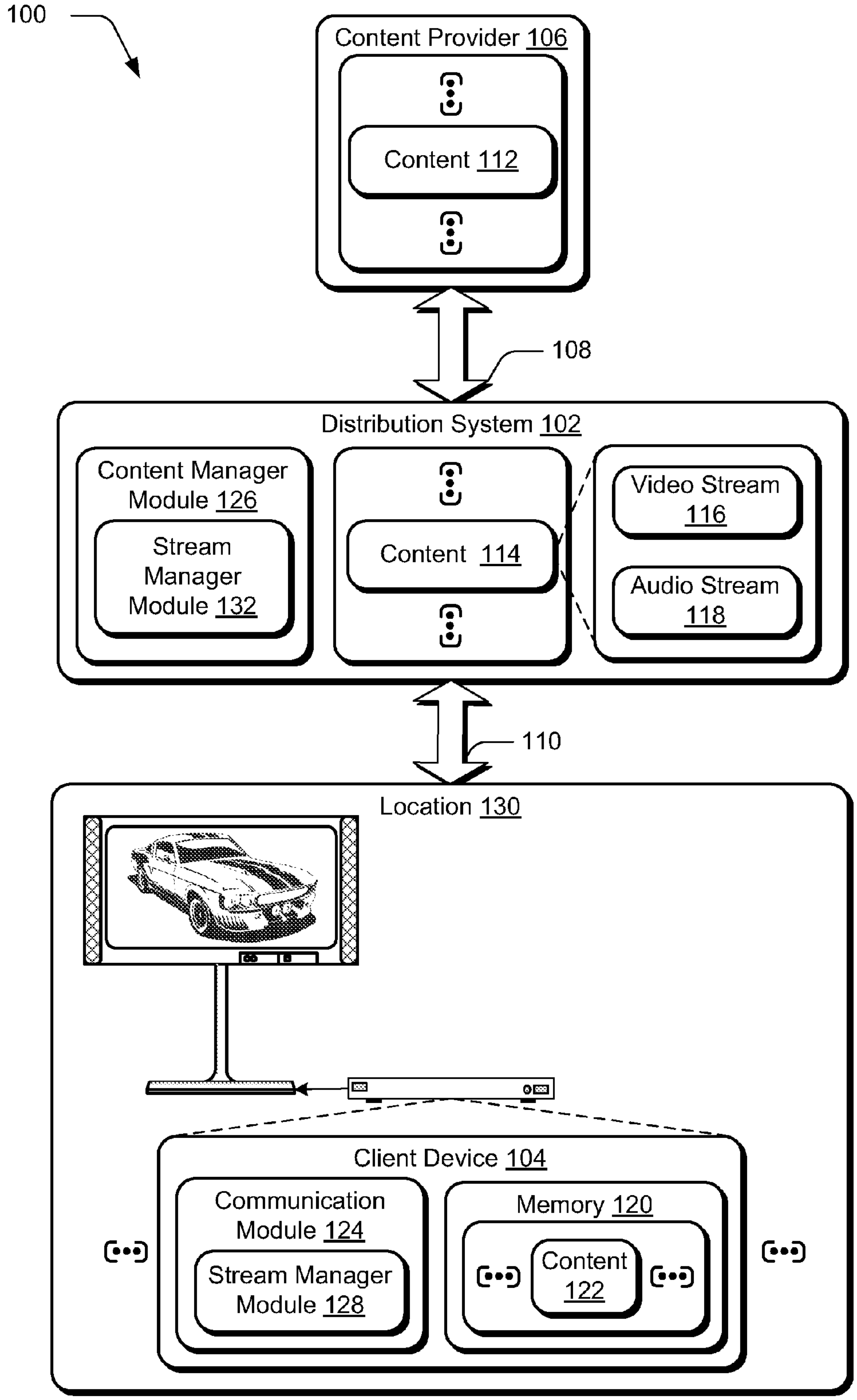
FIG. 1 is an illustration of an environment in an example implementation that is operable to employ techniques to manage streams of content.

FIG. 1 is an illustration of an environment 100 in an example implementation that is operable to manage content streams. The illustrated environment 100 includes a distribution system 102 of a network operator which may employ one or more distribution servers, a client device 104 and a content provider 106 that are communicatively coupled, one to another, via network connections 108, 110. In the following discussion, the distribution system 102, the client device 104 and the content provider 106 may be representative of one or more entities, and therefore reference may be made to a single entity (e.g., the client device 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client device 104 may be configured in a variety of ways. For example, the client device 104 may be configured as a computer that is capable of communicating over the network connection 110, such as a desktop computer (e.g., a media center computer), a mobile station, an entertainment appliance, a set-top box communicatively coupled to a display device as illustrated, a wireless phone, and so forth.

The content provider 106 includes one or more items of content 112. The content 112 may include a variety of data, such as television programming, video-on-demand (VOD) files, downloadable media, and so on. The content 112 is communicated over the network connection 108 to the distribution system 102.

Content 112 communicated via the network connection 108 is received by the distribution system 102 and may be stored as one or more items of content 114. The content 114 may be the same as or different from the content 112 received from the content provider 106. The content 114, for instance, may include additional data for broadcast to the client device 104, such as electronic program guide data, and so on.

The content 114 is also illustrated as including a plurality of streams that include a video stream 116 and an audio stream 118. The video and audio streams 116, 118 may be configured in a variety of ways, such as encapsulated in a transport stream that is communicated over the network connection 110 to the client device 104.

The client device 104, as previously stated, may be configured in a variety of ways to receive the content 114 streamed over the network connection 110. The client device 104 typically includes hardware and software to transport and decrypt the content 114 received from the distribution system 102 for rendering, e.g., by the illustrated display device and speakers.

The client device 104 in the example environment 100 includes digital video recorder (DVR) functionality. For instance, the client device 104 may include memory 120 to record content 114 as content 122 received via the network connection 110 for output to and rendering by the display device and speakers. The memory 120 may be configured in a variety of ways, such as a hard disk drive, a removable computer-readable medium (e.g., a writable digital video disc), semiconductor based memory, and so on. Thus, content 122 that is stored in the memory 120 of the client device 104 may be copies of the content 114 that was streamed from the distribution system 102.

The client device 104 as illustrated in this example also includes a communication module 124 that is executable on the client device 104 to control content playback on the client device 104, such as through the use of one or more "command modes", i.e., "trick modes", to tune to a particular channel, order pay-per-view content, and so on. The command modes may provide non-linear playback of the content 122 (i.e., time shift the playback of the content 122) such as pause, rewind, fast forward, slow motion playback, and the like.

The distribution system 102 is illustrated as including a content manager module 126. The content manager module 126 is representative of functionality to configure content 114 for streaming over the network connection 110 to the client device 104. The content manager module 126, for instance, may configure content 112 received from the content provider 106 to be suitable for transmission over the network connection 108, such as to "packetize" the content 114 into a plurality of streams that are encapsulated within a transport stream for distribution over the Internet, map the content 112 to particular channels, and so on.

Thus, in the environment 100 of FIG. 1, the content provider 106 may broadcast the content 112 over a network connection 108 to a multiplicity of network operators, an example of which is illustrated as distribution system 102. The distribution system 102 may then stream the content 114 over a network connection 110 to a multitude of client devices, an example of which is illustrated as client device 104. The client device 104 may then store the content 114 in the memory 120 as content 122 and/or render the content 114 immediately for output as it is received, such as when the client device 104 is configured to include digital video recorder (DVR) functionality.

As previously described, traditional techniques made a fundamental assumption that there is a single active consumption of a stream of content per device. This made the client device unable to properly represent the priority of its currently consumed streams, e.g., if it supports multiple live viewing screens, using these traditional techniques.

In the illustrated environment 100, however, the client device 104 includes a stream manager module 128 that is representative of functionality of the client device 104 to manage stream usage and accordingly network bandwidth that is shared by the client device 104 with other client devices. For example, the network connection 110 may provide a maximum amount of bandwidth for a fee to the location 130, such as an office, residence, and so on. Accordingly, client devices at the location 130 share the available network bandwidth of the network connection 110.

To manage usage of the network bandwidth of the network connection 110, the stream manager module 128 may be configured to communicate per stream usage by the client device 104 to other client devices. Additionally, the stream manager module 128 may receive communications from the other client devices that describe respective per stream usage. These communications may then serve as a basis to prioritize which streams are permitted to consume the network bandwidth, further discussion of which may be found in relation to the following figure. For example, the priorities may be based on a type of consumption (e.g., recording versus live), a priority assigned to a client device itself (e.g., a television in a family room may be given priority over a television in a bedroom), and so on. Although the stream manager module 128 is illustrated as included on the client device 104, functionality of the stream manager module may be spread distributed devices at the location 130 and even over the network connection, an example of which is illustrated by the stream manager module 132.

It should be noted that one or more of the entities shown in FIG. 1 may be further divided (e.g., the distribution system 102 may be implemented by a plurality of servers in a distributed computing system), combined, and so on and thus the environment 100 of FIG. 1 is illustrative of one of a plurality of different environments that may employ the described techniques.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof In the case of a software implementation, for instance, the module, functionality, or logic represents program code that performs specified tasks when executed on a processor (e.g., CPU or CPUs). The program code can be stored in one or more computer-readable memory devices, e.g., the memory 120 of the client device 104. The features of the techniques to manage streams are platform-independent, meaning that the techniques may be implemented on a variety of commercial computing platforms having a variety of processors.

Figure 2:
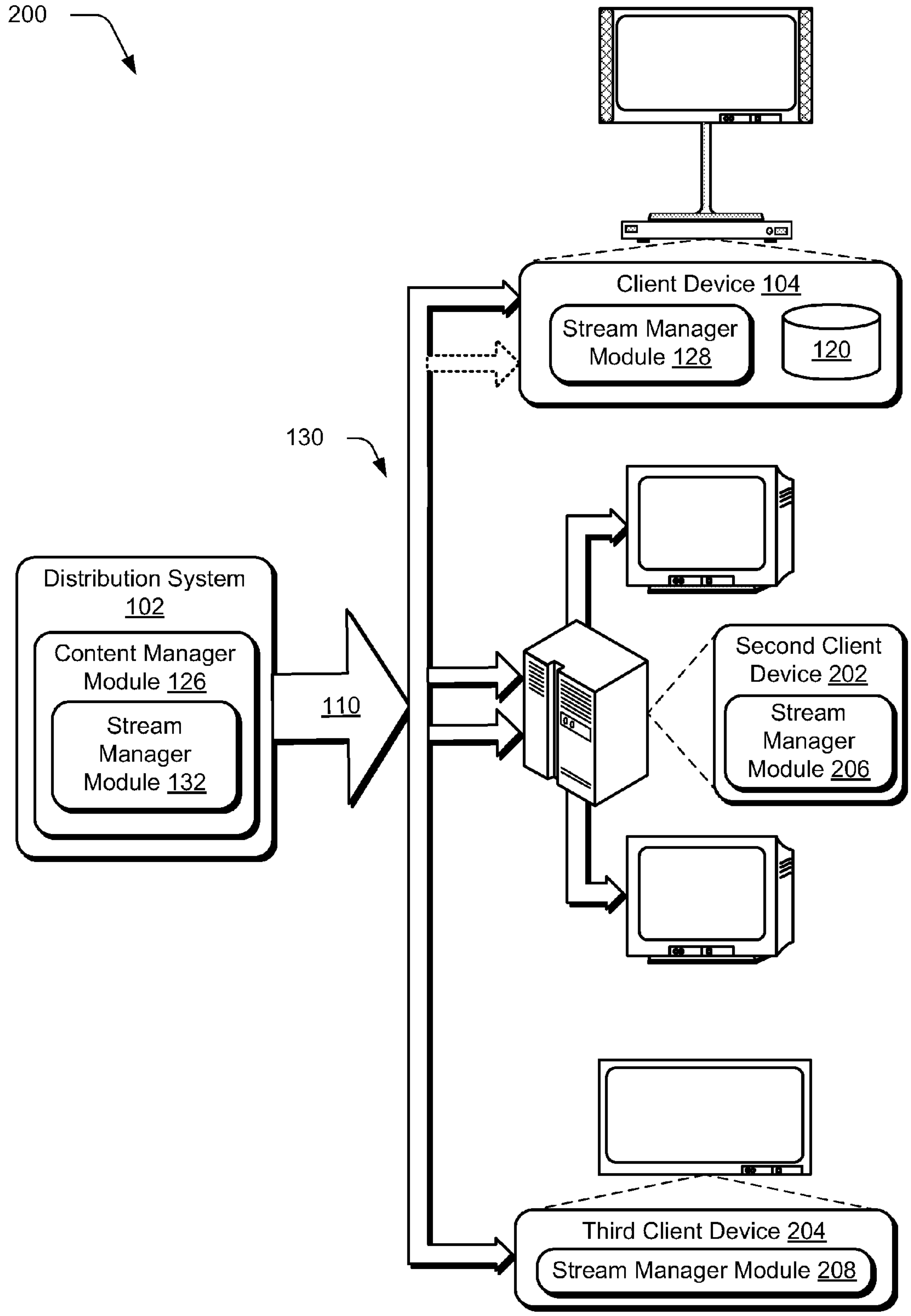
FIG. 2 is an illustration of an example system showing a distribution system and a client device of FIG. 1 in greater detail as streaming content associated with a plurality of streams over a network connection to a plurality of clients at a location that shares network bandwidth of the connection.

FIG. 2 illustrates an example system 200 showing the distribution system 102 and the location 130 that includes the client device 104 in greater detail. The location 130 is illustrated as including the client device 104 as well as a second client device 202 and a third client device 204. The second and third client devices 202, 204 are illustrated with respective stream manager modules 206, 208.

For IP based client devices, the number of simultaneous streams of content that can be consumed may be limited based on the bandwidth available at the location 130 through the network connection 110. Accordingly, in this example bandwidth management is shared across the client devices at the location 130 such that each device knows about the streams that other devices are consuming To accomplish this, the respective stream manager modules 128, 206, 208 may form communications to describe per stream usage by the respective client devices 104, 202, 204.

For example, the stream manager module 128 of client device 104 may form a communication that describes per stream usage at the client device 104, such as a single stream is currently being used to display live television. Likewise, the stream manager module 206 of the second client device 202 may form a communication that describes use of a first stream to output video-on-demand on a first display device of the second client device 202. The communication may also describe use of a second stream to output pay-per-view content on a second display device of the second client device 202. Thus, this communication may describe multiple streams, although separate communications for each stream are also contemplated. Further, the stream manager module 208 of the third client device 204 may form a communication that describes usage of a single stream to display live television.

The communications may then be leveraged by the stream manager modules 128, 206, 208 to manage bandwidth that is available via the network connection 110. For example, assume that the network bandwidth is sufficient to support four streams of content as illustrated by the arrows at the location 130 in FIG. 2. If the client device 104 requests access to an additional stream to record content to memory 120 (e.g., the request of the additional stream is illustrated in phantom in FIG. 2), the stream manager modules 128, 206, 208 of each of the client device 104, 202, 204 may determine which streams are permitted, e.g., which streams "win" or "lose."

The stream manager modules 128, 206, 208, for instance, may rely on priorities that are assigned to the different streams so that each of the client devices can make the same decision about which streams will "lose" in a bandwidth constrained scenario. These priorities can be determined based on the type of stream (e.g., pay-per-view, VOD, or live content), how the stream is being used (e.g., recording or live), based on the last monitored interaction of the user with a respective playback device, and so on. Thus, the network bandwidth may be managed in a way that addresses the ability of one or more of the client devices to consume multiple streams, e.g., for dual screens, to play one stream and record another, and so on.

Continuing with the previous example, the request to consume an additional stream at the client device 104 may cause the stream manager module 128 to form a communication that describes this intended usage of the stream for transmission to the second and third client device 202, 204. Therefore, each of the client devices 104, 202, 204 has matching information regarding the current and intended future state of usage of the network bandwidth at the location 130. In an implementation, each of the stream manager modules 128, 206, 208 is configured to arrive at a matching result regarding the usage, such as to cease reception of the stream that is given the lowest priority. For instance, the stream manager modules 128, 206, 208 may determine the priority based on type (e.g., recording then video-on-demand then live television) in conjunction with an amount of time that has passed since a user interacted with a respective client device 104, 202, 204 (e.g., moved a remote control, pressed a button, made a motion in a natural user interface that is detected using a camera, and so on). This priority may then be used to cease and/or override reception of the stream that has the lowest relative priority when compared with the priority of the other streams. Further discussion of content stream management may be found in relation to the following procedures.

Example Procedures

The following discussion describes content stream management techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2, respectively.

Figure 3:
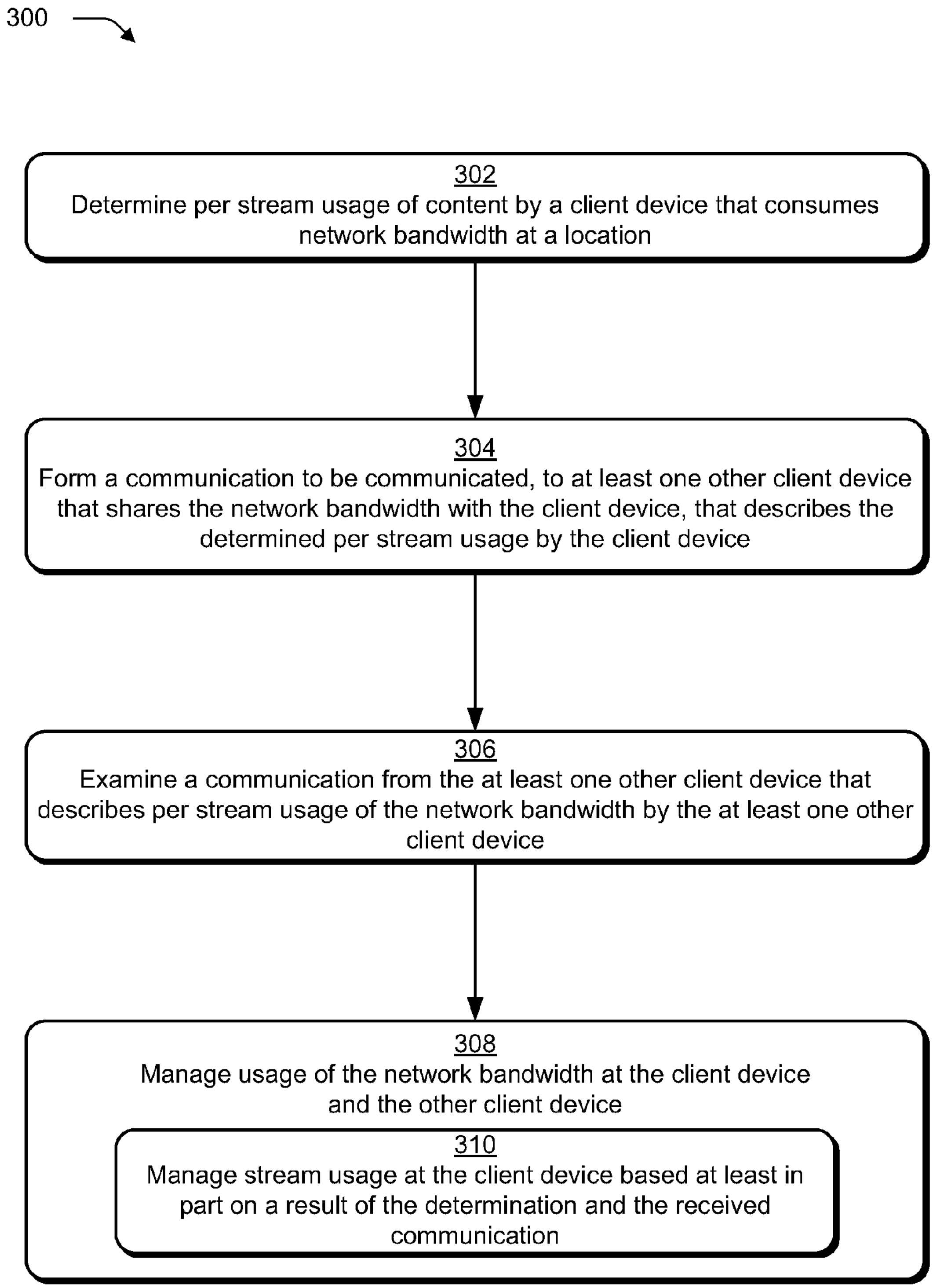
FIG. 3 is a flow diagram depicting a procedure in an example implementation in which per stream usage is determined and communicated to manage network bandwidth usage.

FIG. 3 depicts a procedure 300 in an example implementation in which per stream usage is determined and communicated to manage network bandwidth usage. Per stream usage of content by a client device that consumes network bandwidth at a location is determined (block 302). For example, the stream manager module 128 may include functionality to determine when a user last interacted with the client device 104. A variety of different interactions may be detected, such as movement of a remote control, pressing one or more buttons of the remote control, via a camera (e.g., as a part of a natural user interface (NUI) to detect a user's presence), and so on.

A communication is formed to be communicated to at least one other client device that shares the network bandwidth with the client device and that describes the determined per stream usage by the client device (block 304). The communication may be formed in response to a variety of circumstances, such as a status message that is communicated at regular intervals, formed in response to a request to change stream consumption at the client device 104, and so on. Additionally, the communication may be formed in a variety of ways, such as for broadcast over a wireless connection for receipt with the location 130 by other client devices 202, 204, communicated using the network connections within the location 130 (e.g., using a local router), communicated outside the location 130 using the distribution system 102, and so on.

Further, the communication may describe a variety of different usage of the stream. For example, the communication may describe the type of stream (e.g., VOD versus live television), what the stream is being used for (e.g., live output or recording), user interaction with the stream (e.g., the last time the user interacted with the client device 104, was in the room that includes the client device 104), and so on.

A communication is examined from the at least one other client device that describes per stream usage of the network bandwidth by the at least one other client device (block 306). For example, the stream manager module 128 of the client device 104 may receive communications from the second and third client devices 202, 204 that describe per stream usage. This communication may be the same as or different from the communication formed by the client device 104. For example, the communication may describe user interaction but not type of content, and so on.

Usage of the network bandwidth at the client device and the other client device is managed (block 308). For example, stream usage may be managed at the client device based at least in part on a result of the determination and the received communication (block 310). The stream manager module 128 may determine from the communications that a stream that is to be used to record content in memory 120 has a higher priority than another stream that is consuming bandwidth at the location 130, e.g., to stream live television to the third client device 204. In an implementation, the client device 104 may confirm this result with the other client devices at the location 130 (e.g., the second and third client devices 202, 204) and begin streaming In another implementation, such a confirmation is not communicated. For instance, each of the client devices 104, 202, 204 may use similar considerations to arrive at a matching result. Therefore, in this instance each of the client devices 104, 202, 204 may implement the result (when it relates to the device) without communicating an intent to do so and/or a confirmation. A variety of other examples are also contemplated, another one of which is discussed in relation to the following figure.

Figure 4:
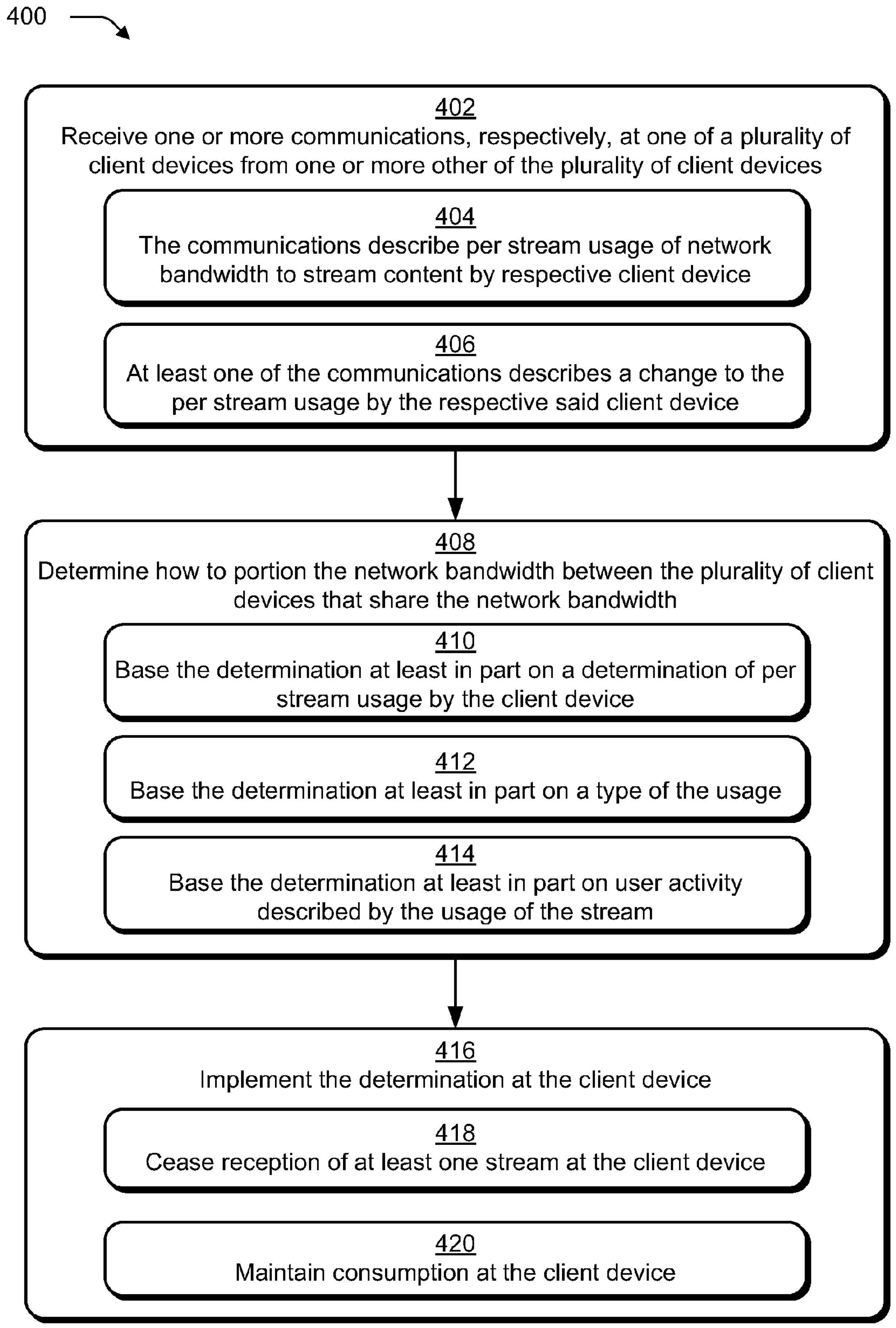
FIG. 4 is a flow diagram depicting a procedure in an example implementation in which network bandwidth management is implemented based on communications communicated between client devices at a location that share network bandwidth.

FIG. 4 depicts a procedure 400 in an example implementation in which network bandwidth management is implemented based on communications communicated between client devices at a location that share network bandwidth. One or more communications are received, respectively, at one of a plurality of client devices from one or more other of the plurality of client devices (block 402). The communications may be configured in a variety of ways. For example, the communications may describe per stream usage of network bandwidth to stream content by a respective client device (block 404). This description may include a variety of information, such as type of stream, user interaction, and so on as previously described.

Additionally, at least one of the communications describes a change to the per stream usage by the respective client device (block 404). The communication, for instance, may be formed responsive to a desired change in consumption of content (e.g., to add or remove a stream) by the client device. Other examples are also contemplated, such as to provide the communications at periodic intervals.

A determination is made as to how to portion the network bandwidth between the plurality of client devices that share the network bandwidth (block 408). For example, the determination may be based at least in part on a determination of per stream usage by the client device (block 410), based on a type of the usage (block 412), based on user activity described by usage of the stream (block 414), and so on.

The determination is implemented at the client device (block 416). For example, if the determination is based on priority and indicates that a stream that is being consumed by the client device has the lowest priority when compared with other streams, reception of the at least one stream at the client device is ceased (block 418). However, if another client device is indicated as consuming a lower priority stream, consumption at the client device is maintained (block 420). Thus, in this example each client device 104, 202, 204 at a location 130 that shares network bandwidth may make a determination as to how the network bandwidth is to be shared. A variety of other examples are also contemplated, such as a centralized determination and subsequent communication.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

examining, by a client device, a communication from at least one other client device that describes per stream usage of network bandwidth by the at least one other client device to receive content; and managing usage of the network bandwidth by the client device based on the communication and a determination of per stream usage of the network bandwidth to receive content by the client device that also consumes at least a portion of the network bandwidth, the client device is configured to manage the usage to arrive at a usage result that matches a usage result determined by the at least one other client device.

2. A method as described in claim 1, wherein the communication describes usage of a plurality of said streams at the at least one other client device.

3. A method as described in claim 1, wherein the content is television content streamed over a network configured in accordance with one or more Internet protocols.

4. A method as described in claim 1, wherein the managing is based at least in part on an amount of time that a user has interacted with the at least one other client device as indicated by the described usage of the communication.

5. A method as described in claim 1, wherein the managing is based at least in part on a priority that is assigned to the per stream usage described in the communication from the at least one other client device in comparison to a priority that is assigned to the determined per stream usage of the network bandwidth to receive content by the client device.

6. A method as described in claim 1, wherein the managing is based at least in part on a type of usage.

7. A method as described in claim 1, further comprising determining the per stream usage of content by the client device that consumes at least the portion of the network bandwidth.

8. A method as described in claim 7, further comprising forming a communication to be communicated to the at least one other client device that described the determined per stream usage of content by the client device.

9. A method as described in claim 8, wherein the communication is configured to enable the at least one other client device to manage usage of the network bandwidth at the at least one other client device.

10. A method as described in claim 9, wherein one or more techniques used to perform the managing of the usage of the bandwidth at the client device match one or more techniques used to manage the usage of the bandwidth at the other client device.

11. A client device comprising:

one or more processors; and memory, communicatively coupled to the one or more processors, storing instructions that, when executed by the one or more processors, perform operations comprising:

determining per stream usage of content at the client device that consumes at least a portion of network bandwidth that is available at a location;

forming a communication to be communicated to at least one other client device that shares the network bandwidth that is available at the location with the client device, the communication describing per stream usage by the client device;

examining another communication, from the at least one other client device, that describes per stream usage of the other client device that consumes at least a portion of the network bandwidth, the communication from the at least one other client device describing usage of a plurality of streams, each said stream used to communicate television content, such that the communication describes consumption of the plurality of streams of television content; and managing, at the client device, the per stream usage of the client device based at least in part on the determination of the per stream usage of content at the client device and the described per stream usage of the other client device described by the other communication, the management of the per stream usage including determining which streams used by the client device and which of the plurality of streams used by the other client device are permitted to continue consuming said network bandwidth.

12. A client device as described in claim 11, wherein the location is a single building used as a residence and the network bandwidth is provided to the residence for a fee.

13. A client device as described in claim 11, wherein the location is a single building used as a business and the network bandwidth is provided to the business for a fee.

14. A client device as described in claim 11, wherein the per stream usage is managed based at least in part on an amount of time that a user has interacted with the at least one other client device as indicated by the described usage of the communication.

15. A client device as described in claim 11, wherein the per stream usage is managed based at least in part on a priority that is assigned to the usage by the at least one other client device in comparison to the usage assigned to the client device.

16. A client device as described in claim 11, wherein the per stream usage is managed based at least in part on a type of usage.

17. One or more computer-readable media storage memories comprising instructions that are stored thereon that, responsive to execution by a client device, cause the client device to perform operations comprising:

comparing, at the client device, per stream usage of content that consumes network bandwidth with per stream usage of a plurality of streams of content used by another client device that shares bandwidth that is assigned to a location that includes the client device and the other client device, the comparing performed using a communication received from the other client device which describes that the content usage of other client device comprises one or more video streams and one or more audio streams;

prioritizing the per stream usage of the client device and the other client device based, at least in part, on the comparing;

determining, based on the prioritizing, which streams used by the client device and which of the plurality of streams used by the other client device are permitted to continue consuming said network bandwidth; and implementing the prioritized per stream usage at the client device based, at least in part, on the determining.

18. One or more computer-readable storage memories as described in claim 17, wherein the implementing of the prioritized per stream usage causes the client device to cease reception of at least one said stream at the client device.

19. One or more computer-readable storage memories as described in claim 17, wherein the implementing of the prioritized per stream usage causes the client device to maintain consumption at the client device of one or more said streams.

20. One or more computer-readable storage memories as described in claim 17, wherein the prioritizing of the per stream usage of the client device is based, at least in part, on a last monitored interaction with the client device.

* * * * *